(12) United States Patent
Hu et al.

(10) Patent No.: US 9,042,000 B2
(45) Date of Patent: May 26, 2015

(54) FLEXIBLE LIQUID CRYSTAL DISPLAY AND FLEXIBLE FLUID DISPLAY

(71) Applicant: Wistron Corporation, New Taipei (TW)

(72) Inventors: Tarng-Shiang Hu, New Taipei (TW);
Yi-Kai Wang, New Taipei (TW);
Yu-Jung Peng, New Taipei (TW);
Tsung-Hua Yang, New Taipei (TW);
Chih-Hao Chang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/287,440

(22) Filed: May 27, 2014

(65) Prior Publication Data

US 2014/0268297 A1    Sep. 18, 2014

Related U.S. Application Data

(62) Division of application No. 13/346,400, filed on Jan. 9, 2012, now Pat. No. 8,804,065.

(30) Foreign Application Priority Data

Aug. 26, 2011 (TW) .............................. 100130761 A

(51) Int. Cl.
*G02B 26/00* (2006.01)
*G02F 1/1333* (2006.01)
*G02F 1/1339* (2006.01)

(52) U.S. Cl.
CPC ........ *G02B 26/005* (2013.01); *G02F 1/133305* (2013.01); *G02F 1/133377* (2013.01); *G02F 1/13394* (2013.01); *G02F 2001/13396* (2013.01)

(58) Field of Classification Search
CPC ...................................................... G02B 26/004
USPC .............. 359/290, 228, 226.3, 245, 665, 666; 349/156, 157, 160, 60, 58; 313/511
See application file for complete search history.

(56) References Cited

U.S. PATENT DOCUMENTS

| | | | |
|---|---|---|---|
| 6,016,176 A | 1/2000 | Kim et al. | |
| 6,501,529 B1 * | 12/2002 | Kurihara et al. | ............... 349/160 |
| 6,577,496 B1 | 6/2003 | Gioscia et al. | |
| 6,886,751 B2 | 5/2005 | Silverbrook | |
| 7,112,114 B2 | 9/2006 | Liang et al. | |
| 7,184,118 B2 | 2/2007 | Lee et al. | |
| 7,675,580 B2 * | 3/2010 | Rho | ............................ 349/12 |
| 7,714,801 B2 | 5/2010 | Kimmel | |

(Continued)

FOREIGN PATENT DOCUMENTS

WO    2011020013    2/2011

*Primary Examiner* — Tuyen Tra
(74) *Attorney, Agent, or Firm* — McClure, Qualey & Rodack, LLP

(57) ABSTRACT

A flexible liquid crystal display and a flexible fluid display are provided. The flexible liquid crystal display includes a first module, a second module, at least two supporting structures and a liquid crystal layer. The second module is disposed correspondingly to the first module. The supporting structures are separately disposed between the first module and the second module and used for abutting the first module and the second module, so that a space between the first module and the second module is divided into a flexible area and two non-flexible areas. The flexible area is located between the two non-flexible areas. The liquid crystal layer is disposed in the flexible area and the two non-flexible areas.

9 Claims, 6 Drawing Sheets

(56) References Cited

U.S. PATENT DOCUMENTS

| | | | |
|---|---|---|---|
| 8,031,275 B2 * | 10/2011 | Lee .................... | 349/12 |
| 8,170,631 B2 | 5/2012 | Aoki et al. | |
| 8,228,667 B2 | 7/2012 | Ma | |
| 8,325,313 B2 * | 12/2012 | Wang et al. .......... | 349/155 |
| 8,379,378 B2 | 2/2013 | Visser et al. | |
| 8,662,731 B2 | 3/2014 | Wang et al. | |
| 8,922,520 B2 * | 12/2014 | Chen .................... | 345/174 |
| 2002/0027636 A1 | 3/2002 | Yamada | |
| 2007/0097014 A1 | 5/2007 | Solomon et al. | |
| 2007/0184367 A1 | 8/2007 | Kim et al. | |
| 2009/0021666 A1 | 1/2009 | Chen | |
| 2010/0164837 A1 | 7/2010 | Kao et al. | |
| 2010/0289996 A1 | 11/2010 | Wang et al. | |
| 2011/0140996 A1 | 6/2011 | Parry-Jones | |
| 2011/0228190 A1 | 9/2011 | Yang et al. | |
| 2012/0154707 A1 | 6/2012 | Hsieh et al. | |
| 2012/0262870 A1 | 10/2012 | Leung | |

\* cited by examiner

US 9,042,000 B2

FLEXIBLE LIQUID CRYSTAL DISPLAY AND FLEXIBLE FLUID DISPLAY

This application is a Divisional of pending U.S. patent application Ser. No. 13/346,400, filed Jan. 9, 2012 and entitled "FLEXIBLE LIQUID CRYSTAL DISPLAY AND FLEXIBLE FLUID DISPLAY", now allowed. The prior application Ser. No. 13/346,400 claims the benefit of Taiwan application Serial No. 100130761, filed Aug. 26, 2011, the subject matter of which is incorporated herein by reference.

BACKGROUND OF THE INVENTION

1. Field of the Invention

The invention relates in general to a flexible liquid crystal display and a flexible fluid display, and more particularly to a flexible liquid crystal display and a flexible fluid display both having flexible and non-flexible areas.

2. Description of the Related Art

Along with the advance in the display technology, various types of display are provided and have achieved rapid advance. In general, most displays include an upper substrate, a lower substrate, a display medium and a number of spacers. The display medium is distributed between the upper substrate and the lower substrate. The spacers are disposed between the upper substrate and the lower substrate to provide the supporting function. If the display has the property of flexibility, the user can bend the display according to the needs. Thus, the display has a property similar to that of paper. With the foldable property, the flexible display has the advantages of easy storage and portability, and has become one of the focuses in the research and development of the display technology. However, as the display is repeatedly bended by the user, the spacers located at the bending positions may be deformed or broken. Due to the lack of stable support between the upper substrate and the lower substrate, a force may thus be applied to the display medium. Being pressed by the force, the display medium might be non-uniformly distributed, and the display quality of the display will thus be deteriorated. Therefore, how to provide a display capable of increasing the bending reliability has become one of important tasks for industries.

SUMMARY OF THE INVENTION

The invention is directed to a flexible liquid crystal display and a flexible fluid display, in which a space between the first module and the second module is divided into flexible area and non-flexible areas through a number of supporting structures. Thus, the display effect will not be affected even when the user repeatedly bends the flexible area, so that product reliability and market competitiveness are both increased.

According to one embodiment of the present invention, a flexible liquid crystal display including a first module, a second module, at least two supporting structures and a liquid crystal layer is provided. The second module is disposed correspondingly to the first module. The supporting structures are separately disposed between the first module and the second module and used for abutting the first module and the second module, so that a space between the first module and the second module is divided into a flexible area and two non-flexible areas. The flexible area is located between two non-flexible areas. The liquid crystal layer is disposed in the flexible area and the two non-flexible areas.

According to an alternate embodiment of the present invention, a flexible fluid display including a first module, a second module, at least two supporting structure and a fluid is provided. The first module includes an electrode layer and a hydrophobic material layer stacked in order. The second module is disposed correspondingly to the first module. The supporting structures are separately disposed between the first module and the second module and used for abutting the first module and the second module, so that a space between the first module and the second module is divided into a flexible area and two non-flexible areas. The flexible area is located between two non-flexible areas. A fluid is disposed in the flexible area and the two non-flexible areas. The electrode layer modifies the hydrophobic property of the hydrophobic material layer according to whether a voltage is received so as to make the fluid enter a different distribution state.

The above and other aspects of the invention will become better understood with regard to the following detailed description of the non-limiting embodiment (s). The following description is made with reference to the accompanying drawings.

DETAILED DESCRIPTION OF THE INVENTION

First Embodiment

Figure 1A:
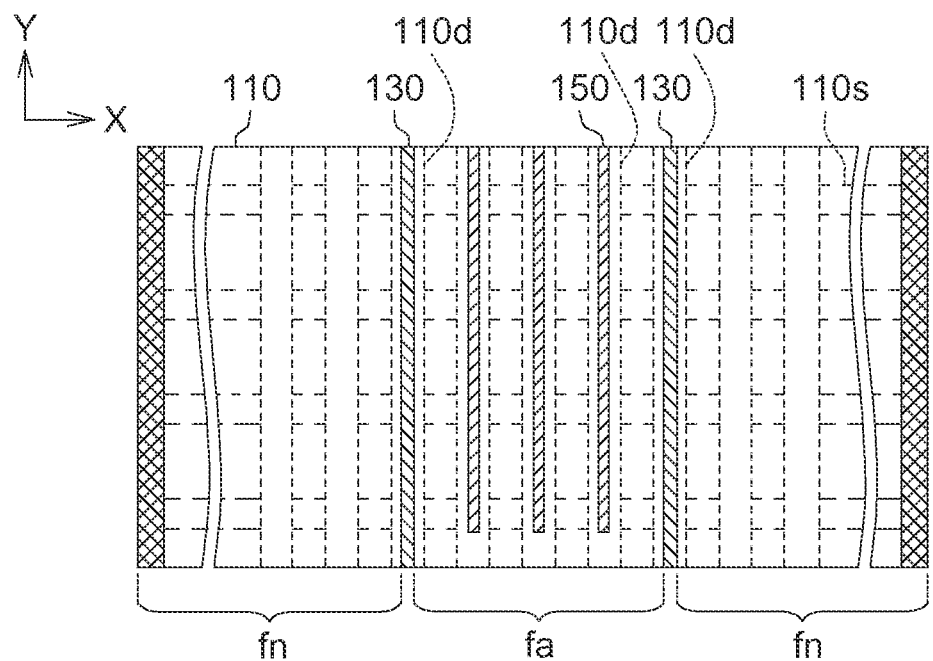
FIG. 1A shows a top view of a first module of a flexible display and the structure thereof according to the first embodiment of the invention.
Figure 1B:
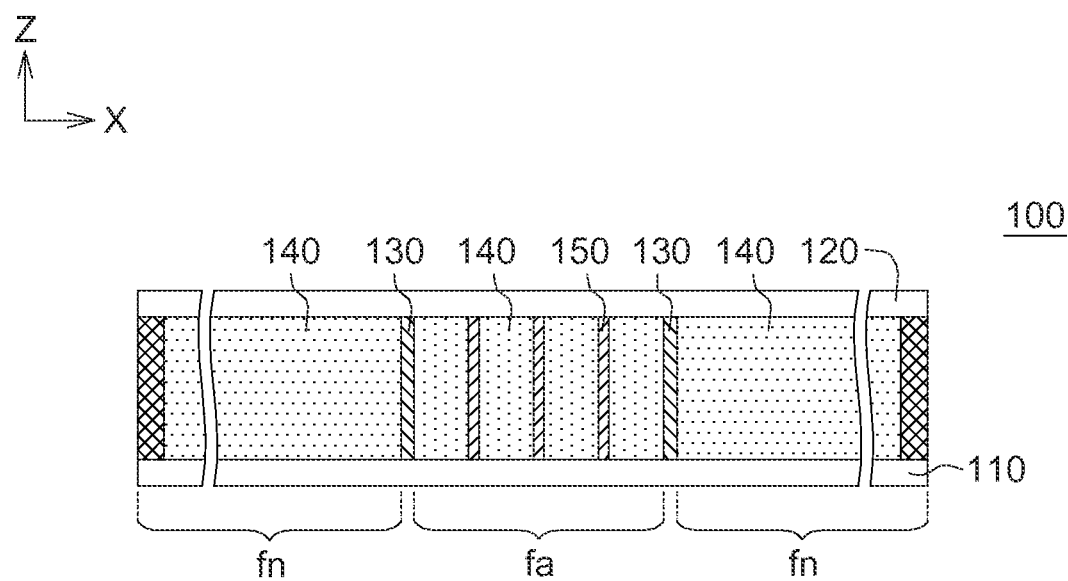
FIG. 1B shows a cross-sectional view of the flexible display of FIG. 1A.

Referring to FIG. 1A and FIG. 1B. FIG. 1A shows a top view of a first module of a flexible display and the structure thereof according to a first embodiment of the invention. FIG. 1B shows a cross-sectional view of the flexible display of FIG. 1A. The flexible display 100 includes a first module 110, a second module 120, at least two supporting structures 130 and a display medium 140. To clearly illustrate the interior structure and disposition of the flexible display 100, the second module 120 and the display medium 140 are not illustrated in FIG. 1A.

The second module 120 is disposed correspondingly to the first module 110. The supporting structures 130 are separately disposed between the first module 110 and the second module 120 and used for abutting the first module 110 and the second module 120, so that a space between the first module 110 and the second module 120 is divided into a flexible area (fa) and two non-flexible areas (fn). The flexible area fa is located between two non-flexible areas fn. The display medium 140 is disposed in the flexible area fa and the two non-flexible areas fn. That is, the display medium 140 is filled in three independent closed areas formed by a flexible area fa and two non-flexible areas fn. In comparison to a display lacking of the flexible area fa and the non-flexible areas fn, when the user repeatedly bends the flexible area fa of the flexible display 100, the display medium 140 in the flexible area fa which is exerted by an external force would be blocked by the supporting structures 130 and would not be able to flow to the two non-flexible areas fn. Thus, the display medium 140 in the flexible area fa still remains in the flexible area fa, and the display medium 140 in the non-flexible areas fn still remains in the non-flexible areas fn, so that the flexible display 100 possesses stable display quality.

In the present embodiment of the invention, the flexible display 100 further includes a number of sub-supporting structures 150 disposed in the flexible area fa and used for abutting the first module 110 and the second module 120. The supporting structures 130 and the sub-supporting structures 150 can be formed on the first module 110 or the second module 120 by way of printing, transferring, lithography or spraying. Moreover, the supporting structures 130 and the sub-supporting structures 150 can further be adhered to the first module 110 and the second module 120, so that the structure of the flexible area fa is more stable and the display quality of the flexible display 100 can be more stably maintained. For example, after the first module 110, the second module 120, the supporting structures 130 and the sub-supporting structures 150 are assembled together, the assembly is baked, and is further radiated by a UV light, so that the supporting structures 130 and the sub-supporting structures 150 can be adhered to the first module 110 and the second module 120. In the present embodiment of the invention, the height of each supporting structure 130 and that of each sub-supporting structure 150 are substantially equal to the gap between the first module 110 and the second module 120. Thus, besides the supporting structures 130, the sub-supporting structures 150 also provide supporting function in the flexible area fa.

In an exemplification of the present embodiment of the invention, the first module 110 includes a number of data lines 110d and a number of scan lines 110s. The data lines 110d and the scan lines 110s are interlaced with each other to form a number of pixel areas. The positions of two supporting structures 130 correspond to that of two of the data lines 110d and extend along two of the data lines 110d. Further, the position of each sub-supporting structures 150 is disposed correspondingly to that of any of the data lines 110d or any of the scan lines 110s. In an exemplification of the present embodiment of the invention, a supporting structure 130, a number of sub-supporting structures 150 and another supporting structure 130 are sequentially disposed correspondingly to the positions of adjacent data lines 110d, and the supporting structures 130 and the sub-supporting structures 150 all extend along the Y-axis direction. Thus, none of the supporting structures 130 and the sub-supporting structures 150 is disposed in the pixel areas lest the supporting structures 130 and the sub-supporting structures 150 might affect the aperture ratio of the flexible display 100 when providing support. Alternatively, when the aperture ratio of the flexible display 100 is not a matter of concern, the supporting structures 130 and the sub-supporting structures 150 could be disposed in the pixel areas.

Figure 2A:
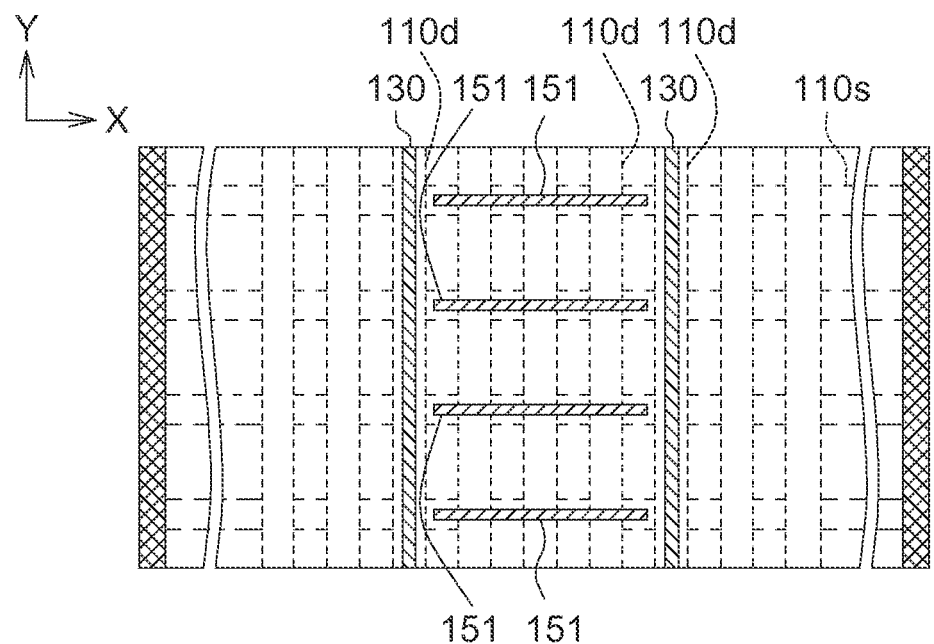
FIG. 2A-FIG. 2C respectively show the top views of other flexible displays according to the first embodiment of the invention.
Figure 2B:
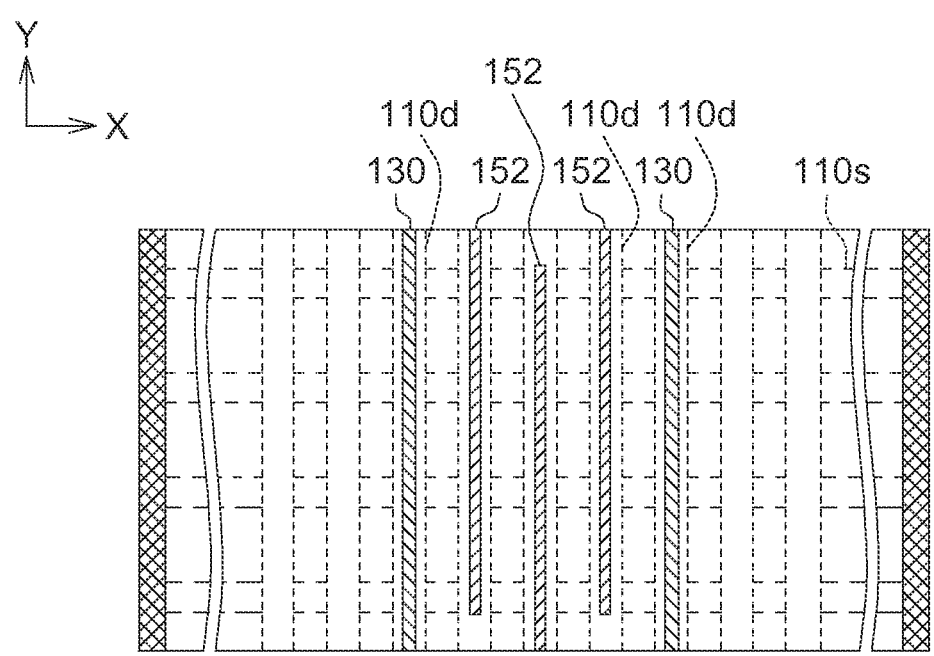
Figure 2C:
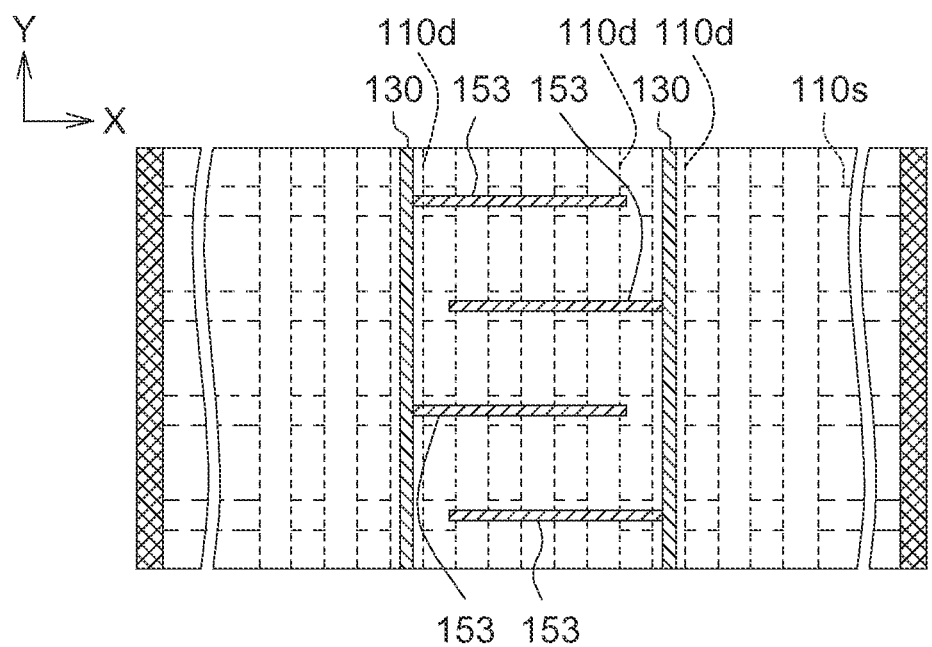

Alternatively, each sub-supporting structure 150 could be disposed without corresponding to the adjacent data line 110d as illustrated in FIG. 2A-FIG. 2C. Referring to FIG. 2A-FIG. 2C, top views of other flexible displays according to a first embodiment of the invention are respectively shown. In comparison to the sub-supporting structures 150 of FIG. 1A, the sub-supporting structures 151 of FIG. 2A extend along the X-axis direction and correspond to a number of scan lines 110s. As the sub-supporting structures 150 depicted in FIG. 1A, a number of sub-supporting structures 152 of FIG. 2B also extend along the Y-axis direction and correspond to a number of data lines 110d. Two ends of the adjacent sub-supporting structures 152 of FIG. 2B are not aligned with each other for enhancing the effect of blocking the display medium around the edges of the flexible display. Thus, the possibility of free-flow display medium is greatly decreased. Similar to the sub-supporting structures 151 of FIG. 2A, a number of sub-supporting structures 153 of FIG. 2C also extend along the X-axis direction and correspond to a number of scan lines 110s. Two ends of the adjacent sub-supporting structures 153 of FIG. 2C are not aligned with each other for enhancing the effect of blocking the display medium at the location near the supporting structures 130. Thus, the possibility of free-flow display medium is greatly decreased.

As indicated in FIG. 1A and FIG. 2A-FIG. 2C, the cross-section of the sub-supporting structure is a rectangle; however, could be other shapes such as a trapezoid or others. In the present embodiment, the sub-supporting structures disposed on the XY plane are depicted as the shape of strips, as indicated in FIG. 1A and FIG. 2A-FIG. 2C. However, anyone who is skilled in the art would understand that the sub-supporting structures disposed on the XY plane can also be in the shape of grids or crosses, which are capable to provide the support function and block the movement of the display medium simultaneously.

Second Embodiment

Figure 3A:
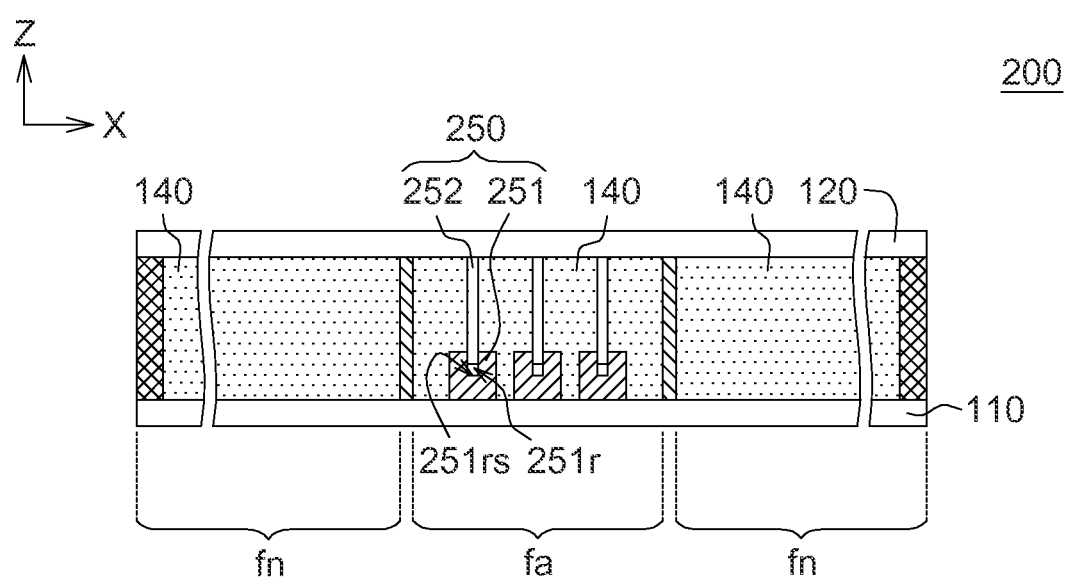
FIG. 3A shows a cross-sectional view of a flexible display according to the second embodiment of the invention.

Referring to FIG. 3A, a cross-sectional view of a flexible display according to the second embodiment of the invention is shown. In comparison to the first embodiment, each sub-supporting structure 250 of the flexible display 200 of the present embodiment of the invention includes a first structure 251 and a second structure 252.

Figure 3B:
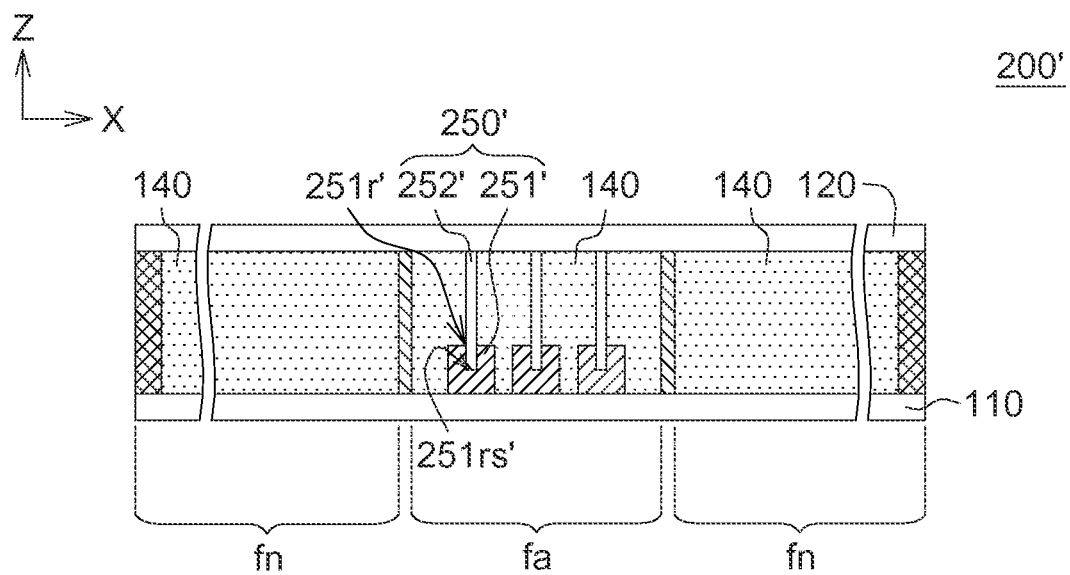
FIG. 3B shows a cross-sectional view of another flexible display according to the second embodiment of the invention.

In an exemplification of the present embodiment, the first structure 251 is disposed in the first module 110 and located between the first module 110 and the second module 120; the second structure 252 is disposed in the second module 120 and located between the first module 110 and the second module 120. The first structure 251 has a notch 251r in which the second structure 252 is embedded. To put it in greater details, the second structure 252 and the bottom surface 251rs of the notch 251r are separated by a gap. Referring to FIG. 3B, a cross-sectional view of another flexible display according to the second embodiment of the invention is shown. The flexible display 200' of FIG. 3B is different from the flexible display 200 of FIG. 3A in that the second structure 252' of the sub-supporting structure 250' of the flexible display 200' of FIG. 3B abuts the bottom surface 251rs' of the notch 251r' of the first structure 251'.

According to the disposition indicated in either FIG. 3A or FIG. 3B, even when the flexible area fa is repeatedly bended by a user and makes the second structure 252 or 252' become slightly bended, the second structure 252 is still embedded in the notch 251r and will not come off the notch 251r easily, and so is the second structure 252' still embedded in the notch 251r' and will not come off the notch 251r' easily either. Thus, the display medium 140 is blocked by the sub-supporting structure 250 or 250', and the possibility of free-flow display medium is greatly decreased, so that the display quality of the flexible display 200 or 200' can be maintained. Also, an adhesive layer (not illustrated) could be disposed between the first structure 251 or 251' and the second structure 252 or 252', and the first structure and the second structure are adhered to each other to enhance the structural strength of the sub-supporting structure.

The flexible display 100, 200 or 200' disclosed in the above embodiments can be realized by such as a flexible liquid crystal display or a flexible fluid display. The flexible fluid display is such as an electrowetting display or an electrofluidic display, and the details are elaborated below.

The flexible liquid crystal display includes the elements disclosed in the first embodiment or the second embodiment. The first module could be a thin-film-transistor module, the second module could be a color filter module, and the display medium could be a liquid crystal layer. The dispositions of other elements such as the supporting structures and the sub-supporting structures are not repeatedly described here. Given that the existing manufacturing process is adopted, the flexible liquid crystal display still can achieve similar effects disclosed in the first embodiment or the second embodiment and has the advantage of reducing costs.

Figure 4A:
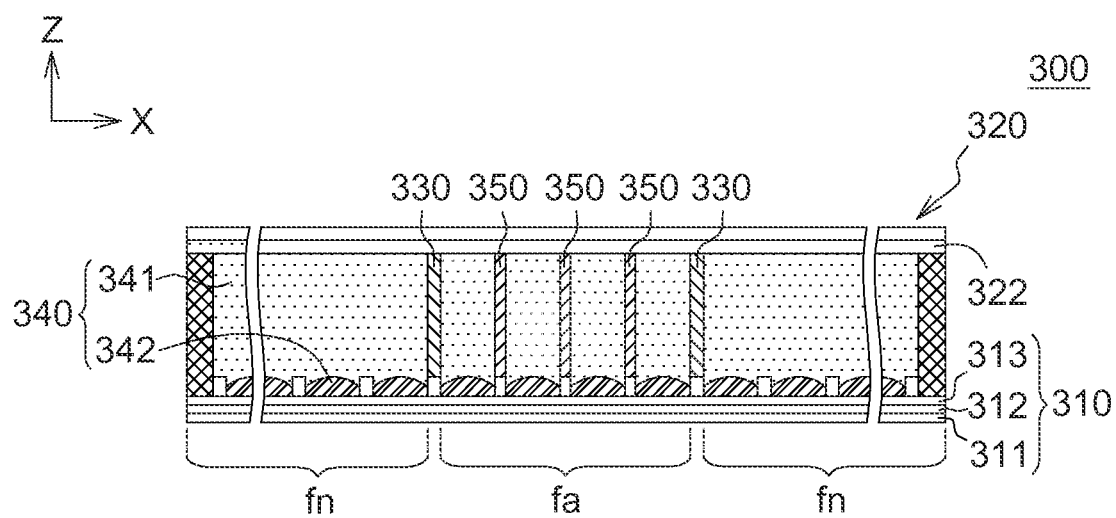
FIG. 4A and FIG. 4B respectively shows the cross-sectional views of a flexible fluid display in different states according to an embodiment of the invention.
Figure 4B:
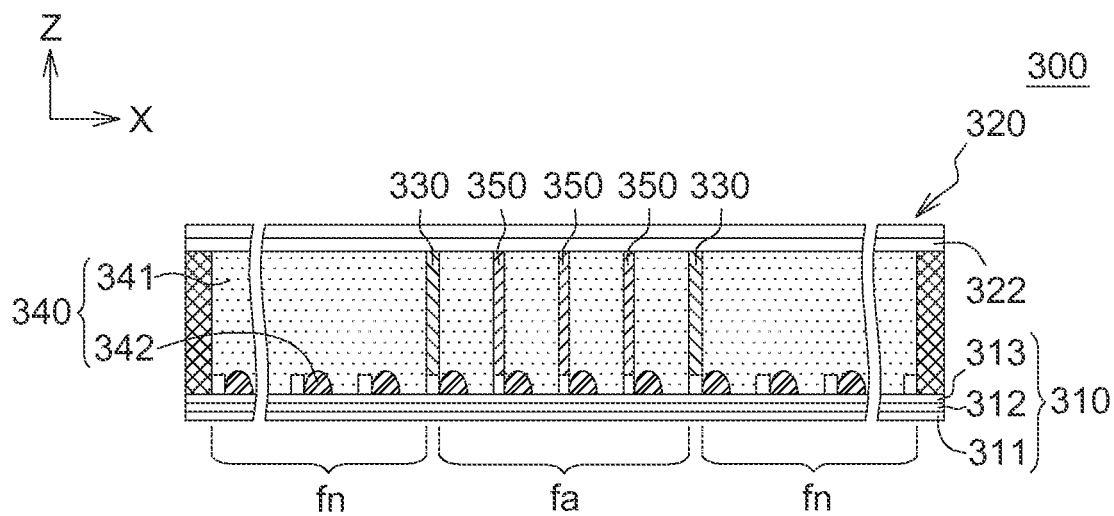

Referring to FIG. 4A and FIG. 4B, the cross-sectional views of a flexible fluid display in different states according to an embodiment of the invention are respectively shown. As indicated in FIG. 4A and FIG. 4B, the flexible fluid display 300 is an electrowetting display. The flexible fluid display 300 includes the elements disclosed in the first embodiment or the second embodiment. The first module 310 includes a bottom plate 311, an electrode layer 312 and a hydrophobic material layer 313 which are stacked in order. The second module 320 includes an electrode layer 322. The dispositions and structures of the supporting structures 330 and the sub-supporting structures 350 are similar to that of the supporting structures and the sub-supporting structures of the first embodiment, and the similarities are not repeatedly described here. The display medium 340 is a fluid including a water solution 341 and an ink 342 both disposed in the flexible area fa and the two non-flexible areas fn.

The electrode layers 312 and 322 modify the hydrophobic property of the hydrophobic material layer 313 according to whether a voltage is received, so that the display medium 340 (fluid) is in a different distribution state. As indicated in FIG. 4A, before the voltage is received by the electrode layers 312 and 322, the water solution 341 and the ink 342 are disposed layer by layer, so that the flexible fluid display 300 displays the color of the ink 342. As indicated in FIG. 4B, after the voltage is received by the electrode layers 312 and 322, the hydrophobic property of the hydrophobic material layer 313 deteriorates. The water solution 341 directly contacts the hydrophobic material layer 313 and expels the ink 342, so that the flexible fluid display 300 displays the color of the bottom plate 311. Since the supporting structures 330 and sub-supporting structures 350 of the flexible fluid display 300 are similar to that disclosed in the above embodiments, the flexible fluid display 300 can also achieve the same effects disclosed in the first embodiment or the second embodiment.

Figure 5A:
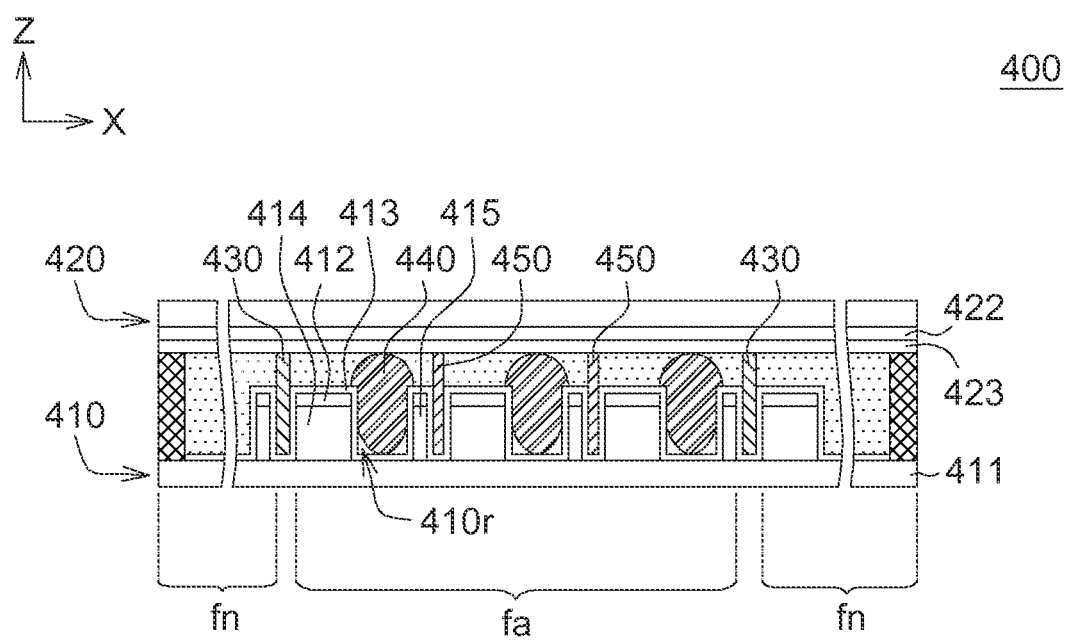
FIG. 5A and FIG. 5B respectively show the cross-sectional views of another flexible fluid display in different states according to an embodiment of the invention.
Figure 5B:
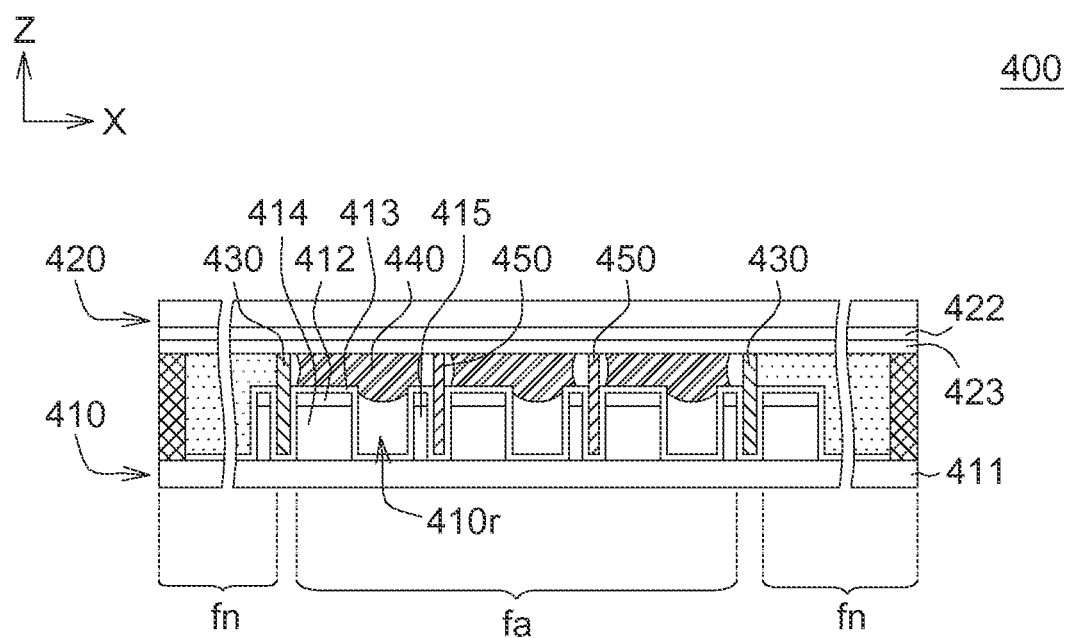

Referring to FIG. 5A and FIG. 5B, cross-sectional views of another flexible fluid display in different states according to an embodiment of the invention are respectively shown. As indicated in FIG. 5A and FIG. 5B, the flexible fluid display 400 is an electrofluidic display. The flexible fluid display 400 includes the elements disclosed in the first embodiment or the second embodiment. To put it in greater details, the first module 410 includes a bottom plate 411, an electrode layer 412, a hydrophobic material layer 413, a number of first protrusions 414 and a number of second protrusions 415. The first protrusions 414 and the second protrusions 415 are disposed on the bottom plate 411. The electrode layer 412 covers the first protrusions 414 and the second protrusions 415, and the hydrophobic material layer 413 covers the electrode layer 412 and the bottom plate 411 as well as the lateral sides of the first protrusions 414 and the second protrusions 415 to form a recess 410r. The second module 420 includes an electrode layer 422 and a hydrophobic material layer 423. The dispositions and structures of the supporting structures 430 and the sub-supporting structures 450 are similar to that of the supporting structures and sub-supporting structures of the above embodiments, and the similarities are not repeatedly described here. The display medium 440, could be a fluid containing liquid pigment, is disposed in the flexible area fa and the two non-flexible areas fn.

The electrode layers 412 and 422 modify the hydrophobic property of the hydrophobic material layers 413 and 423 according to whether a voltage is received, so that the display medium 440 (ex: a fluid containing liquid pigment) is in a different distribution state. As indicated in FIG. 5A, before the electrode layers 412 and 422 receive the voltage, most display medium 440 is located in the recess 410r, so that the flexible fluid display 400 displays the color of the bottom plate 411. As indicated in FIG. 5B, after the electrode layers 412 and 422 receive the voltage, the hydrophobic property of the hydrophobic material layers 413 and 423 deteriorates, so that the display medium 440 is expelled from the recess 410r and distributed between the two hydrophobic material layers 413 and 423 to make the flexible fluid display 400 display the color of display medium 440. Since the supporting structures 430 and the sub-supporting structures 450 of the flexible fluid display 400 are similar to that disclosed in the previous embodiment, the flexible fluid display 400 can also achieve the same effects disclosed in the first embodiment or the second embodiment.

According to the flexible liquid crystal display and the flexible fluid display disclosed in the above embodiments of the invention, the flexible area and the non-flexible areas are divided by the supporting structures, and the display effect will not be affected despite the flexible areas are repeatedly bended by the user, so that product reliability and market competitiveness are enhanced. In an embodiment, the flexible liquid crystal display or the flexible fluid display can further include a number of sub-supporting structures formed as one integrated piece (the first embodiment) or may include a first structure and a second structure (the second embodiment) for providing blocking and supporting functions. In an alternative embodiment, the supporting structures correspond to the data lines and the sub-supporting structures correspond to the data lines or the scan lines, so that the aperture ratios of the flexible liquid crystal display and the flexible fluid display would not be affected when the supporting structures and the sub-supporting structures are providing supporting function.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flexible fluid display, comprising:
   a first module comprising an electrode layer and a hydrophobic material layer stacked in order;
   a second module disposed correspondingly to the first module;
   at least two supporting structures separately disposed between the first module and the second module and used for abutting the first module and the second module, so that a space between the first module and the second module is divided into a flexible area and two non-flexible areas, wherein the flexible area is located between the two non-flexible areas, and the flexible area and the two non-flexible areas are three independent closed areas; and a fluid disposed in the flexible area and the two non-flexible areas, wherein the electrode layer modifies the hydrophobic property of the hydrophobic material layer according to whether a voltage is received so as to make the fluid enter a different distribution state.

2. The flexible fluid display according to claim 1, further comprising:

a plurality of sub-supporting structures disposed in the flexible area and used for abutting the first module and the second module.

3. The flexible fluid display according to claim 2, wherein a height of each sub-supporting structure is substantially equal to a first gap between the first module and the second module.

4. The flexible fluid display according to claim 2, wherein each sub-supporting structure comprises:

a first structure disposed in one of the first module and the second module and located between the first module and the second module, wherein the first structure has a notch; and a second structure disposed in the other of the first module the second module and located between the first module and the second module, wherein the second structure is embedded in the notch.

5. The flexible fluid display according to claim 4, wherein the second structure abuts a bottom surface of the notch.

6. The flexible fluid display according to claim 5, wherein the second structure and the bottom surface of the notch are separated by a second gap.

7. The flexible fluid display according to claim 2, wherein one of the first module and the second module comprises:

a plurality of data lines; and a plurality of scan lines, interlaced with the data lines, wherein the position of each sub-supporting structure is disposed correspondingly to that of any of the data lines or scan lines.

8. The flexible fluid display according to claim 1, wherein one of the first module and the second module comprises:

a plurality of data lines; and a plurality of scan lines interlaced with the data lines, wherein the positions of the at least two supporting structures correspond to that of two of the data lines and extend along two of the data lines.

9. The flexible fluid display according to claim 1 being an electrowetting display or an electrofluidic display.

* * * * *